United States Patent
Likar et al.

(10) Patent No.: US 10,057,813 B1
(45) Date of Patent: Aug. 21, 2018

(54) ONBOARDING AND CONFIGURING WI-FI ENABLED DEVICES

(71) Applicant: wildfire.exchange, inc., San Francisco, CA (US)

(72) Inventors: Bojan Likar, Cupertino, CA (US); Leon Kukovec, Campbell, CA (US); Ihab Abu-Hakima, Los Altos, CA (US)

(73) Assignee: Plume Design, Inc., Palo Alto, CA (US)

(*) Notice: Subject to any disclaimer, the term of this patent is extended or adjusted under 35 U.S.C. 154(b) by 59 days.

(21) Appl. No.: 14/709,158

(22) Filed: May 11, 2015

Related U.S. Application Data

(60) Provisional application No. 61/991,379, filed on May 9, 2014, provisional application No. 61/992,655, filed on May 13, 2014.

(51) Int. Cl.
*H04W 28/18* (2009.01)
*H04W 12/06* (2009.01)

(52) U.S. Cl.
CPC ........... *H04W 28/18* (2013.01); *H04W 12/06* (2013.01)

(58) Field of Classification Search
CPC ..... H04W 76/02; H04W 12/06; H04W 28/18; H04L 63/10
See application file for complete search history.

(56) References Cited

U.S. PATENT DOCUMENTS

| | | | | |
|---|---|---|---|---|
| 9,220,012 B1* | 12/2015 | Inamdar | ................ | H04W 12/08 |
| 9,401,901 B2* | 7/2016 | Huang | .................. | H04L 63/062 |
| 2006/0023651 A1* | 2/2006 | Tsuchiuchi | ............ | H04W 12/06 370/310 |
| 2006/0045272 A1* | 3/2006 | Ohaka | ................... | H04L 9/3271 380/270 |
| 2006/0153156 A1* | 7/2006 | Wentink | .................. | H04W 8/22 370/338 |
| 2007/0066306 A1* | 3/2007 | Cheng | ..................... | H04L 63/06 455/445 |
| 2007/0147318 A1* | 6/2007 | Ross | ..................... | H04L 63/104 370/338 |
| 2007/0157024 A1* | 7/2007 | Miller | ................. | H04L 63/0428 713/168 |
| 2008/0175386 A1* | 7/2008 | Bestermann | .......... | H04L 63/062 380/270 |
| 2008/0198823 A1* | 8/2008 | Shiu | ...................... | H04W 48/20 370/338 |
| 2008/0313448 A1* | 12/2008 | Doumuki | ............... | G06Q 30/06 713/1 |

(Continued)

*Primary Examiner* — Noel R Beharry
*Assistant Examiner* — Ruihua Zhang
(74) *Attorney, Agent, or Firm* — Clements Bernard Walker PLLC; Lawrence A. Baratta, Jr.

(57) ABSTRACT

A method of activating and configuring a Wi-Fi enabled device to connect with a Wi-Fi Access Point (AP) by a cloud-based Wi-Fi service manager is disclosed. A unique identifier of the Wi-Fi enabled device and a unique identifier of the Wi-Fi AP are received by the cloud-based Wi-Fi service manager. The unique identifier of the Wi-Fi enabled device is used as a seed for a predetermined algorithm to generate a temporary service set identifier (SSID) and a temporary passphrase. The temporary SSID and the temporary passphrase are sent to the Wi-Fi AP for configuring the Wi-Fi AP with the temporary SSID and the temporary passphrase.

23 Claims, 7 Drawing Sheets

(56) References Cited

U.S. PATENT DOCUMENTS

| | | | | |
|---|---|---|---|---|
| 2009/0043871 | A1* | 2/2009 | Doumuki | H04M 3/42161 709/220 |
| 2009/0043998 | A1* | 2/2009 | Doumuki | H04L 12/2807 713/1 |
| 2011/0078443 | A1* | 3/2011 | Greenstein | H04L 63/061 713/169 |
| 2012/0284785 | A1* | 11/2012 | Salkintzis | G06F 21/43 726/7 |
| 2013/0312074 | A1* | 11/2013 | Sarawat | H04W 12/06 726/7 |
| 2013/0333016 | A1* | 12/2013 | Coughlin | H04W 12/06 726/9 |
| 2014/0053246 | A1* | 2/2014 | Huang | H04L 63/06 726/4 |
| 2014/0062657 | A1* | 3/2014 | Adachi | G07C 9/00007 340/5.64 |
| 2014/0126564 | A1* | 5/2014 | Chou | H04W 88/04 370/338 |
| 2014/0177611 | A1* | 6/2014 | Corrales Lopez | H04W 88/08 370/338 |
| 2014/0204727 | A1* | 7/2014 | Gu | H04W 12/04 370/217 |
| 2014/0247941 | A1* | 9/2014 | Gu | H04L 63/062 380/270 |
| 2015/0078283 | A1* | 3/2015 | Nakamura, Jr. | H04W 12/06 370/329 |
| 2015/0264052 | A1* | 9/2015 | Cho | H04W 4/008 713/176 |

* cited by examiner

ONBOARDING AND CONFIGURING WI-FI ENABLED DEVICES

CROSS REFERENCE TO OTHER APPLICATIONS

This application claims priority to U.S. Provisional Patent Application No. 61/991,379 entitled ONBOARDING/CONFIGURING WIFI-ENABLED DEVICES filed May 9, 2014, which is incorporated herein by reference for all purposes. This application claims priority to U.S. Provisional Patent Application No. 61/992,655 entitled ONBOARDING/CONFIGURING WIFI-ENABLED DEVICES filed May 13, 2014, which is incorporated herein by reference for all purposes.

BACKGROUND OF THE INVENTION

Wi-Fi networks are increasingly used for high-speed wireless connectivity in the home, the office, and in public hotspots. However, configuring a Wi-Fi enabled device to connect to a secure Wi-Fi network can be a cumbersome and complicated process for many end-users. Some existing techniques attempt to allow users to easily configure Wi-Fi devices, but these techniques have multiple security problems and may not be able to protect against brute-force attacks. Therefore, improved techniques for onboarding and configuring Wi-Fi enabled devices would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
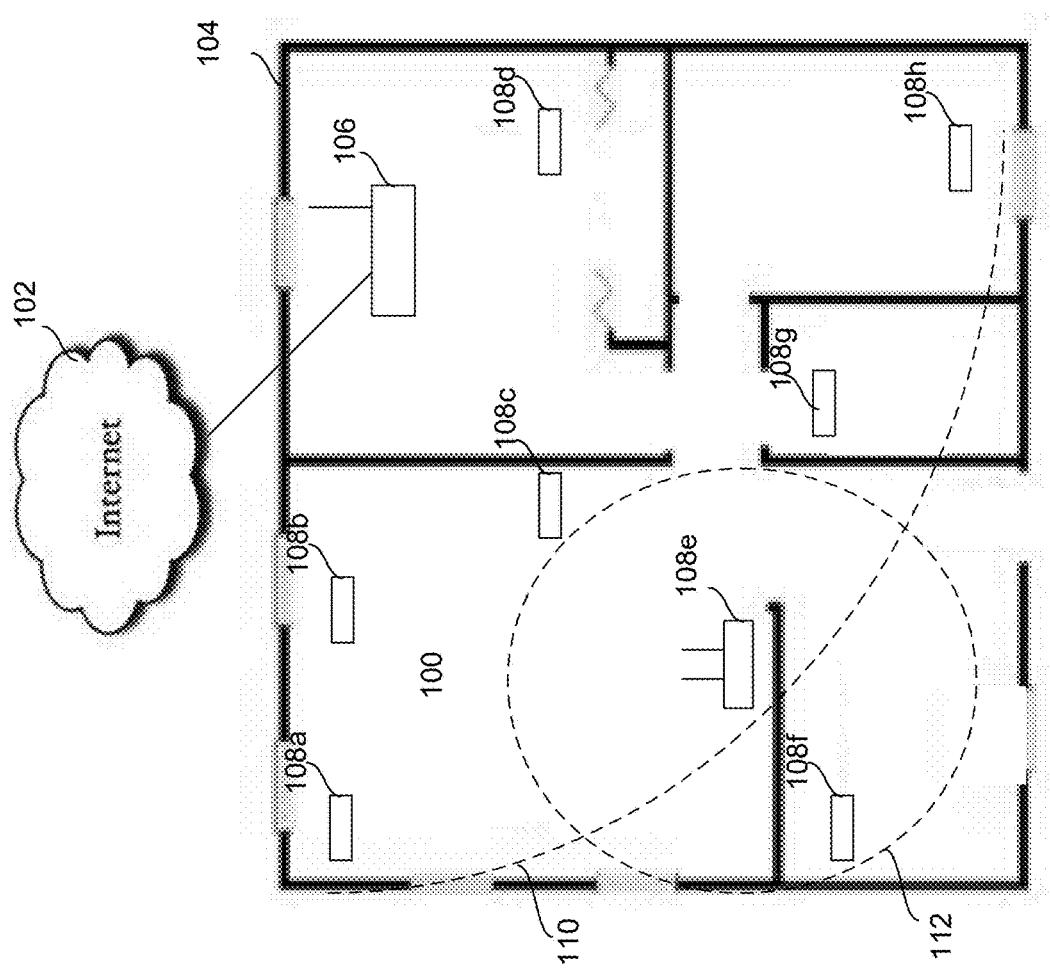
FIG. 1 illustrates an embodiment of a Wi-Fi network 100 deployed at a location 104.

FIG. 1 illustrates an embodiment of a Wi-Fi network 100 deployed at a location 104. Location 104 may be a home, an apartment, an office building, an outdoor area, and the like. A Wi-Fi access point (AP) 106 is connected to the backbone Internet 102, with traffic routed to and from the AP's clients via standard Internet protocols. In some embodiments, AP 106 may be a Wi-Fi gateway that provides different functions, including Wi-Fi access point, router, network address translation (NAT), and firewall functions. In some embodiments, Wi-Fi gateway 106 may be connected to the backbone Internet 102 via a DSL modem or cable modem. In some other embodiments, Wi-Fi gateway 106 may have a built-in modem to connect to the backbone Internet 102 directly.

Configured Wi-Fi enabled devices 108 (108a-108h) may connect to Wi-Fi gateway 106 as Wi-Fi clients when they are within the gateway's coverage area 110. Wi-Fi enabled devices 108 may include desktop computers, laptop computers, tablets, or other mobile computing devices. Wi-Fi enabled devices 108 may also include any Internet of Things (IoT). For example, Wi-Fi enabled devices 108 may include consumer electronics (e.g., Blu-ray players, game consoles, sports equipment, and set-top boxes) and other home appliances (e.g., refrigerators, microwave ovens, sensors, smoke/fire detectors, and security systems). Wi-Fi enabled devices 108 may also include mesh devices.

Another type of Wi-Fi enabled device 108 that may connect to Wi-Fi gateway 106 when it is within the gateway's coverage area is a Wi-Fi range extender 108e. Wi-Fi range extenders are used to expand the reach of a wireless network beyond the coverage area of the original AP or gateway. A Wi-Fi range extender connects wirelessly to the original AP or gateway, receives the signal, and retransmits it. Wi-Fi range extender 108e may be deployed in between Wi-Fi gateway 106 and other Wi-Fi enabled devices that are not close enough to Wi-Fi gateway 106 to fall within the gateway's coverage area 110. For example, as shown in FIG. 1, Wi-Fi enabled device 108f is located at a far corner of location 104 and thus falls outside the coverage area 110 of Wi-Fi gateway 106. But since Wi-Fi enabled device 108f is within the coverage area 112 of Wi-Fi range extender 108e, Wi-Fi enabled device 108f is able to connect to Wi-Fi network 100 and obtain wireless services via Wi-Fi range extender 108e.

However, configuring a Wi-Fi enabled device to connect to a secure Wi-Fi network can be a cumbersome and complicated process for many end-users. In order to associate with the Wi-Fi Gateway, a Wi-Fi enabled device needs to be configured with the correct service set identifier (SSID) and passphrase corresponding to the gateway. An SSID is a unique ID that includes 32 characters and is used for naming a wireless network. For most public and many private Wi-Fi networks, the SSID of the network is broadcasted such that any user may try to connect to it. However, the user can connect to the network only if the user has knowledge of the configured passphrase; the longer the length of the passphrase, the more secure it is from brute-force attacks by an unauthorized user. Typically, an authorized end-user needs to memorize or keep track of a very long passphrase and enter the long passphrase manually and correctly.

Figure 2:
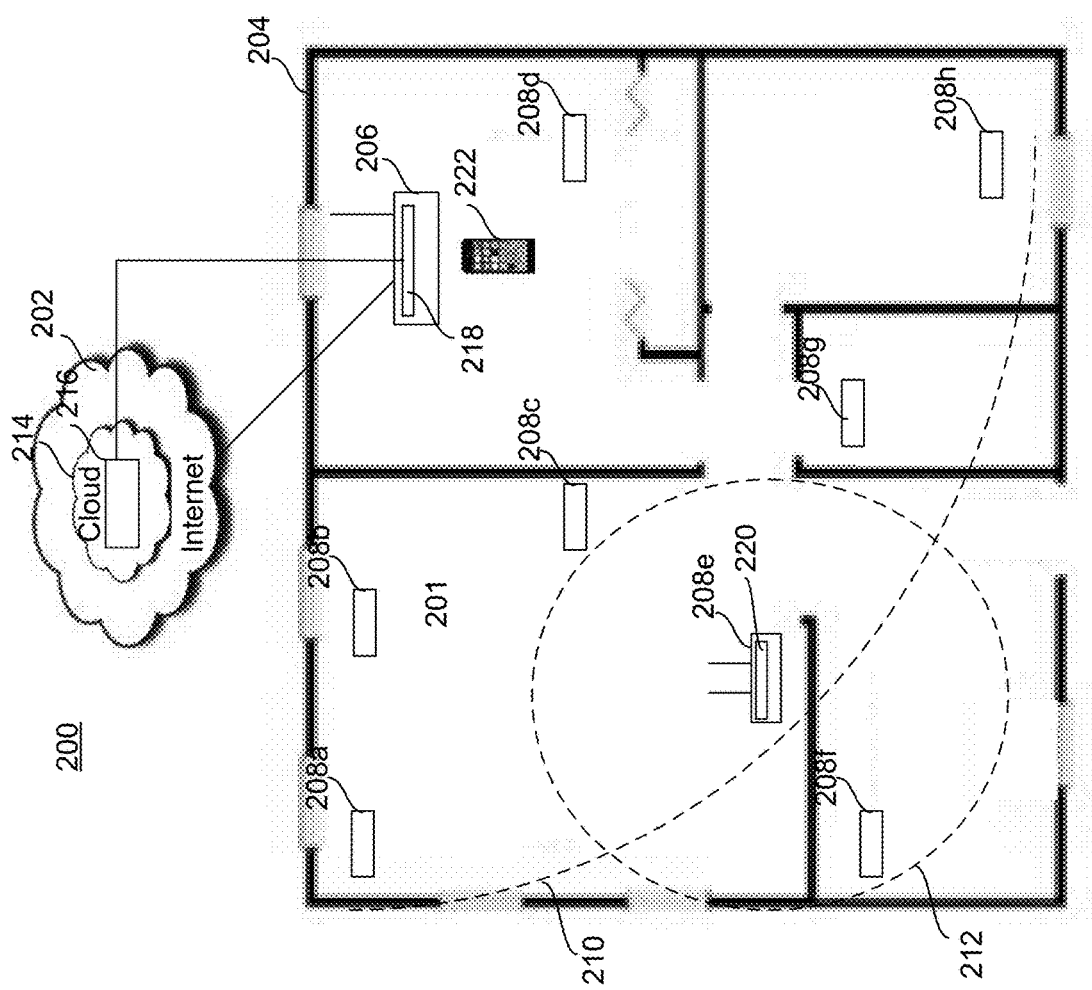
FIG. 2 illustrates an embodiment of a system 200 for onboarding, activating, and configuring Wi-Fi enabled devices to connect to a secure Wi-Fi network.

FIG. 2 illustrates an embodiment of a system 200 for onboarding, activating, and configuring Wi-Fi enabled devices to connect to a secure Wi-Fi network. System 200 may be used to manage and configure a Wi-Fi network 201 deployed at a location 204. Location 204 may be a home, an apartment, an office building, an outdoor area, and the like. Location 204 may belong to different entities, such as a home, a company, an organization, and the like. A Wi-Fi access point (AP) 206 providing Wi-Fi network services is connected to the backbone Internet 202, with traffic routed to and from the AP's clients via standard Internet protocols. In some embodiments, AP 206 may be a Wi-Fi gateway that provides different functions, including Wi-Fi access point, router, network address translation (NAT), and firewall functions. In some embodiments, Wi-Fi gateway 206 may be connected to the backbone Internet 202 via a DSL modem or cable modem. In some other embodiments, Wi-Fi gateway 206 may have a built-in modem to connect to the backbone Internet 202 directly.

Configured Wi-Fi enabled devices 208 (208a-208h) may connect to Wi-Fi gateway 206 as Wi-Fi clients when they are within the gateway's coverage area 210. Wi-Fi enabled devices 208 may include desktop computers, laptop computers, tablets, or other mobile computing devices. Wi-Fi enabled devices 208 may also include any Internet of Things (IoT). For example, Wi-Fi enabled devices 208 may include consumer electronics (e.g., Blu-ray players, game consoles, sports equipment, and set-top boxes) and other home appliances (e.g., refrigerators, microwave ovens, sensors, smoke/fire detectors, and security systems). Wi-Fi enabled devices 208 may also include mesh devices.

Another type of Wi-Fi enabled device 208 that may connect to Wi-Fi gateway 206 when it is within the gateway's coverage area is a Wi-Fi range extender 208e. Wi-Fi range extender 208e is deployed in between Wi-Fi gateway 206 and other Wi-Fi enabled devices that are not close enough to Wi-Fi gateway 206 to fall within the gateway's coverage area 210. For example, as shown in FIG. 2, Wi-Fi enabled device 208f is located at a far corner of location 204 and thus falls outside the coverage area 210 of Wi-Fi gateway 206. But since Wi-Fi enabled device 208f is within the coverage area 212 of Wi-Fi range extender 208e, Wi-Fi enabled device 208f is able to connect to Wi-Fi network 201 and obtain wireless services via Wi-Fi range extender 208e.

System 200 includes a cloud-based Wi-Fi service manager 216 that is deployed in a cloud 214. System 200 further includes a plurality of cloud-based Wi-Fi agents (218 and 220) that are installed on Wi-Fi gateway 206 and on some or all of the Wi-Fi enabled devices 208 (208a-208h), respectively. For example, as shown in FIG. 2, cloud-based Wi-Fi agent 218 is installed on Wi-Fi gateway 206, and cloud-based Wi-Fi agent 220 is installed on Wi-Fi range extender 208e, respectively. System 200 may further include a user interface accessible by an application (e.g., a mobile application or web browser running on a mobile device 222). For example, the system administrator of location 204 may use the application to communicate with cloud-based Wi-Fi service manager 216 remotely through the Internet 202 in order to access, configure, or monitor Wi-Fi gateway 206 and the various Wi-Fi enabled devices 208.

The system in FIG. 2 has a number of advantages. As will be described in greater detail below, Wi-Fi gateway 206 and Wi-Fi enabled devices 208 that are managed by cloud-based Wi-Fi service manager 216 are not limited to products offered by a single vendor, but can be products that are offered by any third party vendor. In addition, Wi-Fi gateway 206 and Wi-Fi enabled devices 208 do not need to be managed locally by a manager or controller that is deployed on-premise behind a NAT firewall. Instead, they can be managed by cloud-based Wi-Fi service manger 216 deployed in cloud 214 external to a NAT Firewall. Furthermore, the Wi-Fi service may be activated, configured, and monitored remotely through a mobile device by a human user, such as an IT (information technology) administrator. In addition, a Wi-Fi enabled device can be configured with the correct SSID and passphrase corresponding to the gateway without requiring a human user to manually enter the SSID and passphrase.

The user interface accessible by an application (e.g., a mobile application or web browser running on mobile device 222) for activating, configuring, and monitoring the Wi-Fi service via Wi-Fi service manager 216 is referred to as a Wi-Fi service dashboard. The Wi-Fi service dashboard may be used by IT administrators of different entities. One entity type includes individual homes, companies, or organizations. In individual homes, companies, or organizations, the IT administrators are the home owners, company IT administrators, and IT administrators of the organizations, respectively. Another type of entity includes value-added resellers (VARs). A VAR is a company that adds features or services to an existing product, then resells the product (e.g., resells to end-users) as an integrated product or complete "turn-key" solution. For example, a VAR may purchase APs and build a fully operational Wi-Fi network, and customers who lack the time or experience to maintain the equipment and the network themselves (e.g., small offices or organizations) may subscribe to the VAR's service. Another type of entity includes value-added distributors (VADs). In addition to pick and pack services, a VAD offers programs and services that add value to the distributed products, thereby increasing their value or worth. The value addition can be segmented into different areas, including pre-sale, support of the sale, and post-sale.

The Wi-Fi service dashboard allows the IT administrator of a particular entity to activate, configure, and monitor the APs/gateways and the Wi-Fi enabled devices that belong to the entity. For example, two users from two separate households may log on to the Wi-Fi service dashboard independently, and each can access the APs and Wi-Fi enabled devices that belong to his/her own entity, i.e., his/her own home. In another example, the IT administrator of two VARs may log on to the Wi-Fi service dashboard independently and each IT administrator can access the APs and Wi-Fi enabled devices that belong to each of the corresponding VAR's customers.

Figure 3:
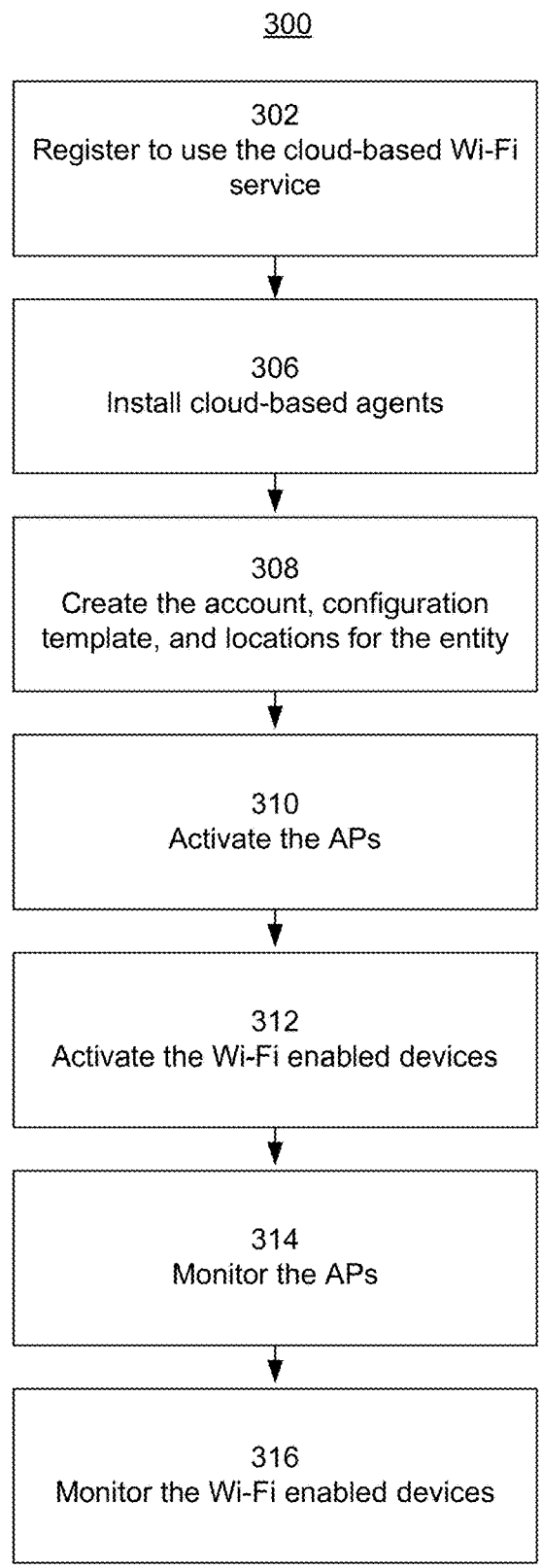
FIG. 3 illustrates an embodiment of a process 300 to set up Wi-Fi services that are managed by a cloud-based Wi-Fi service manager.

FIG. 3 illustrates an embodiment of a process 300 to set up Wi-Fi services that are managed by a cloud-based Wi-Fi service manager. At 302, an entity registers to use the cloud-based Wi-Fi service. The entities may include individuals, companies or organizations, VARs, and VADs. For example, an end-user of a home entity may register to use the cloud-based Wi-Fi service directly. In another example, an IT administrator of a company or organization may register to use the cloud-based Wi-Fi service, and APs and Wi-Fi enabled devices may be deployed in one or more locations belonging to the company or organization. In yet another example, an IT administrator of a VAR may register to re-sell the cloud-based Wi-Fi service, and APs and Wi-Fi enabled devices may be deployed in one or more locations that belong to each of the VAR's customers.

At 306, cloud-based Wi-Fi agents are installed onto the APs and the Wi-Fi enabled devices that are to be deployed in the one or more locations of the entity. A cloud-based Wi-Fi agent may be installed onto an AP or a Wi-Fi enabled device by an end-user who purchases the third-party AP or Wi-Fi enabled device off the shelf. For example, the end-user may download a cloud-based Wi-Fi agent from a website and install the agent onto the AP or Wi-Fi enabled device himself. The cloud-based Wi-Fi agent may also be compiled into the firmware distribution by a VAR or VAD.

Figure 4:
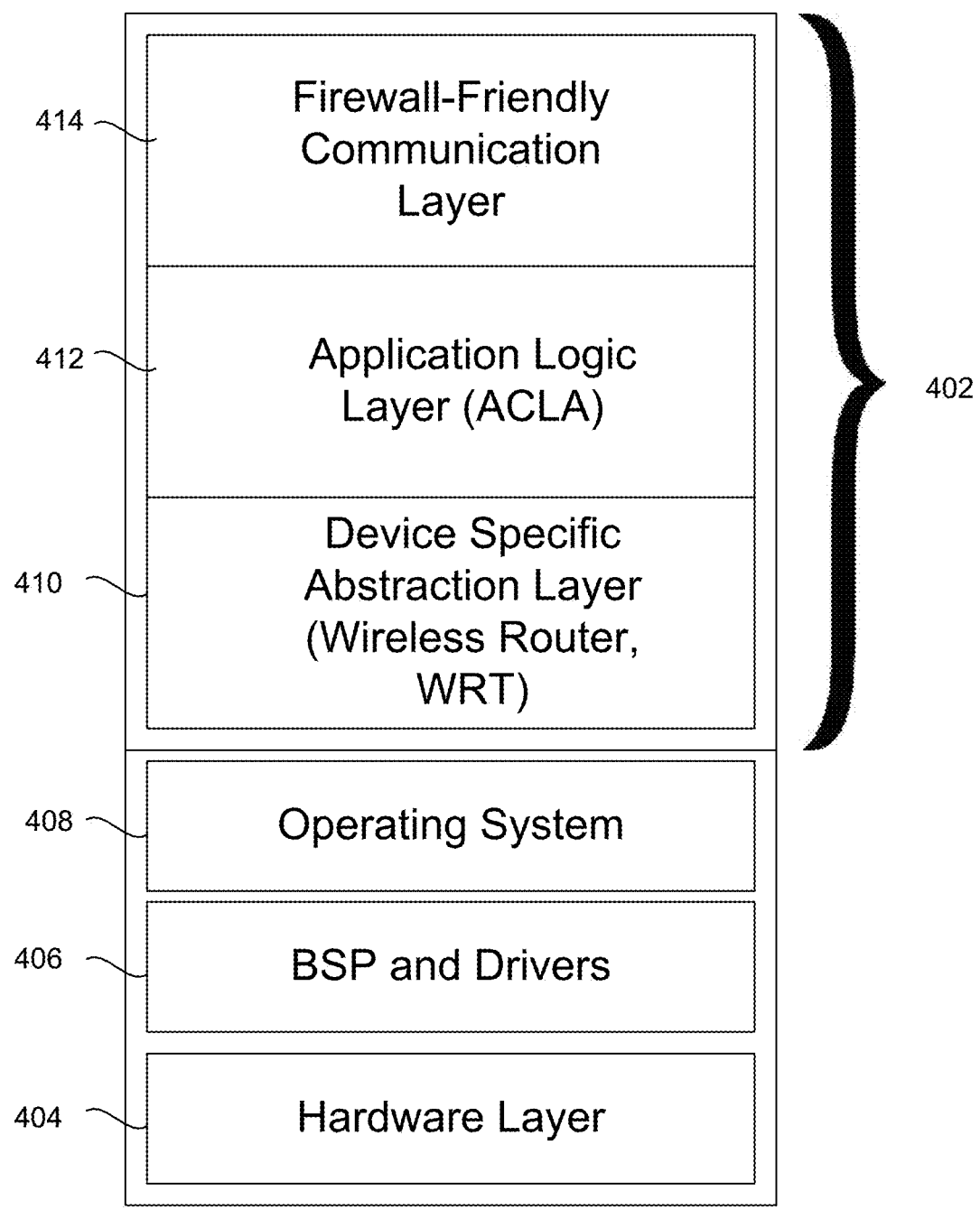
FIG. 4 illustrates an embodiment of a cloud-based Wi-Fi agent installed on a third party AP or a third party Wi-Fi enabled device.

FIG. 4 illustrates an embodiment of a cloud-based Wi-Fi agent installed on a third party AP or a third party Wi-Fi enabled device. Before the installation of the cloud-based Wi-Fi agent firmware, the third party AP or third-party Wi-Fi enabled device includes a number of layers and components, including a hardware layer 404, a board support package (BSP) and drivers 406, and an operating system (OS) 408. A cloud-based Wi-Fi agent 402 is installed on top of the above-mentioned layers and components of the third party AP or third-party Wi-Fi enabled device.

Cloud-based Wi-Fi agent 402 includes a device specific abstraction layer 410, an application logic layer (ACLA) 412 and a firewall-friendly communication layer 414. Device specific abstraction layer 410 is hardware and firmware dependent, while application logic layer 412 and firewall-friendly communication layer 414 are hardware and firmware independent. Because cloud-based Wi-Fi agent 402 needs to be compatible with third-party APs or third-party Wi-Fi devices, it includes a device specific abstraction layer 410 to interface with the hardware and firmware of the different types of third-party APs and third-party Wi-Fi enabled devices. For example, device specific abstraction layer 410 includes interfaces to the specific AP's (or the specific Wi-Fi enabled device) monitoring and configuration parameters. In addition, device specific abstraction layer 410 is an abstraction layer that hides the hardware and firmware differences from the upper layers, including application logic layer 412 and firewall-friendly communication layer 414. Therefore, the logic included in application logic layer 412 and firewall-friendly communication layer 414 can stay unchanged irrespective of the different hardware and firmware layers used by different third party vendors.

Application logic layer 412 includes logic for statistics reporting and configuration. Firewall-friendly communication layer 414 maintains secured and authenticated connections with cloud-based Wi-Fi service manger 216. Firewall-friendly communication layer 414, unlike other protocols, allows not only data and information to be transferred from cloud-based Wi-Fi agent 402 out of a NAT firewall, but also allows configuration parameters and control information to be pushed from cloud-based Wi-Fi service manager 216 down to cloud-based Wi-Fi agent 402, even when cloud-based Wi-Fi AP agent 402 is located behind a NAT firewall. One example of a firewall-friendly communication layer is the Extensible Messaging and Presence Protocol (XMPP); other firewall-friendly communication layer may be used as well.

Referring back to FIG. 3, at 308, the IT administrator or the end-user of the entity logs onto the Wi-Fi service dashboard (e.g., www.dashboard.acceleramb.com) to create an account for a customer and input the locations and the configuration templates for the customer. For example, the IT administrator of a VAR may create an account for a new customer, such as a public school district. After the account for the public school district is created, the IT administrator may configure a plurality of locations corresponding to the customer. For example, the locations may include a plurality of elementary schools within the public school district. The IT administrator may then configure the configuration templates for the various locations of the customer. For example, each of the configuration templates may include a plurality of configuration parameters for each of the locations. In another example, the IT administrator of a small company may create an account for the small company itself. In this case, the customer is the entity itself. After the account for the small company is created, the IT administrator may configure a plurality of locations corresponding to the small company. For example, the locations may include a plurality of company campuses. The IT administrator may then configure the configuration templates for the various locations of the small company. For example, each of the configuration templates may include a plurality of configuration parameters for each of the locations. In yet another example, an end-user of a home entity may create an account for his/her home. After the account is created, the end-user may configure a single location and its corresponding configuration template, which includes a plurality of configuration parameters.

Figure 5:
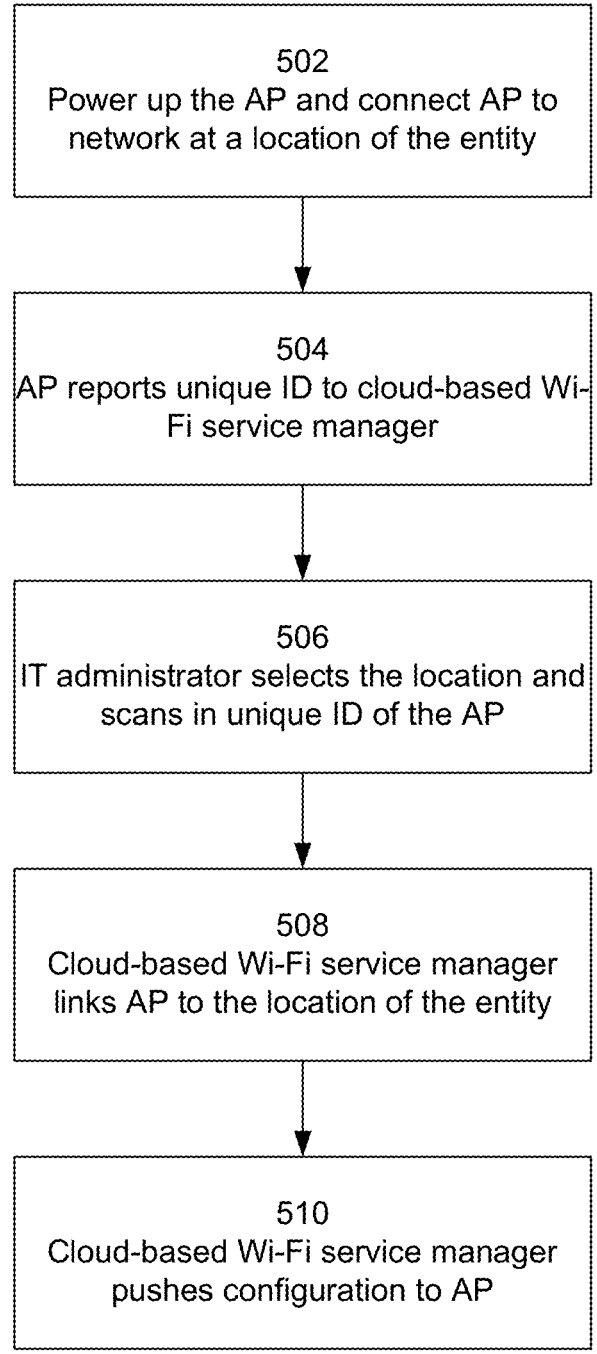
FIG. 5 illustrates an embodiment of a process 500 for activating an AP at a location of the entity.

At 310, the IT administrator or the end-user of the entity goes to each of the locations of the entity to activate the APs using the Wi-Fi service dashboard. FIG. 5 illustrates an embodiment of a process 500 for activating an AP at a location of the entity.

As shown in FIG. 5, at 502, the IT administrator goes to a location of the entity, powers up the AP and connects the AP to a network. For example, the IT administrator of the VAR installing the APs for the public school district may go to one of the elementary schools in the district, power up the AP and connect the AP to a network, e.g., an Ethernet network. In another example, an end-user of a home entity may power up the AP (e.g., AP 206 in FIG. 2) and connect the AP to the Internet via a DSL modem or cable modem.

At 504, the AP automatically initiates a call to cloud-based Wi-Fi service manager 216 and establishes a communication session with cloud-based Wi-Fi service manager 216 via XMPP or another firewall-friendly communication protocol. Cloud-based Wi-Fi AP agent reports to cloud-based Wi-Fi service manager 216, which may include sending a set of information of the AP to cloud-based Wi-Fi service manager 216 via the established communication session. In some embodiments, the set of information includes a unique identifier of the AP, such as the Universal Product Code (UPC), the manufacturer's serial number (MSN), or the media access control (MAC) address of the AP. The unique identifier of the AP may be stored in a database by Wi-Fi service manager 216.

At 506, the IT administrator logs onto the Wi-Fi service dashboard, selects the customer account and the location, and scans in or enters a unique identifier for the AP. Cloud-based Wi-Fi AP agent may then send the customer account and location information together with the unique identifier of the AP to cloud-based Wi-Fi service manager 216. The unique identifier of the AP may be a Universal Product Code (UPC), the manufacturer's serial number (MSN), or the media access control (MAC) address of the AP.

At 508, cloud-based Wi-Fi service manager 216 matches the unique identifier of the AP previously stored as an entry in the database to the scanned-in or inputted unique identifier of the AP, and associates the entry with the location of the entity corresponding to the scanned-in or inputted unique identifier. Recall that at 504, the cloud-based Wi-Fi AP agent has already reported to cloud-based Wi-Fi service manager 216, including sending the unique identifier of the AP (e.g., the Universal Product Code (UPC), the manufacturer's serial number (MSN), or the media access control (MAC) address of the AP) via the established communication session. The received unique identifier of the AP at 504 has been stored in a database as an entry, but it is not associated with any entity or any of its locations. At 508, cloud-based Wi-Fi service manager 216 has received the scanned or inputted unique identifier of the AP and may match it with the previously stored unique identifier of the AP, along with the location of the entity.

At 510, cloud-based Wi-Fi service manager 216 pushes the configuration template to the AP via the XMPP communication session. The configuration template is selected based on the customer/entity and the location of the AP. When cloud-based Wi-Fi AP agent receives the configuration template, it uses the configuration parameters to configure the AP and the AP is installed. For example, AP/gateway 206 is configured with various configuration parameters, including a particular SSID and passphrase. The AP/gateway 206 may begin to broadcast the SSID.

Figure 6:
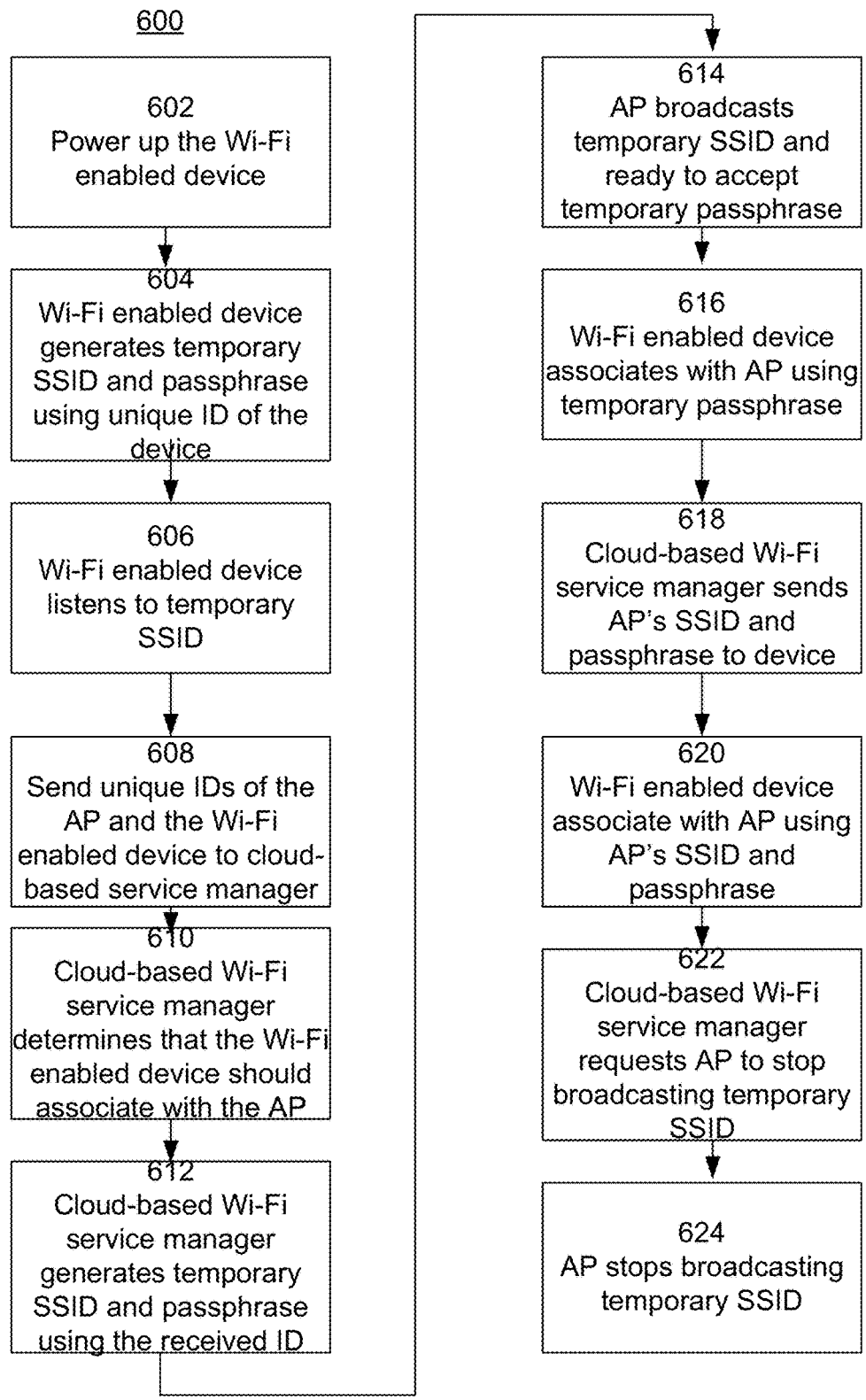
FIG. 6 illustrates an embodiment of a process 600 for onboarding, activating, and configuring a Wi-Fi enabled device at a location of the entity.

Referring back to FIG. 3, at 312, the IT administrator or the end-user of the entity activates the Wi-Fi enabled devices using the Wi-Fi service dashboard. FIG. 6 illustrates an embodiment of a process 600 for onboarding, activating, and configuring a Wi-Fi enabled device at a location of the entity. For example, process 600 may be used to activate Wi-Fi range extender 208e to associate with Wi-Fi gateway 206.

As shown in FIG. 6, at 602, the IT administrator or end-user powers up the Wi-Fi enabled device (e.g., Wi-Fi range extender 208e in FIG. 2). The position of the Wi-Fi enabled device should be located within the coverage area of the AP (e.g., Wi-Fi gateway 206) that the Wi-Fi enabled device is about to associate with.

After the Wi-Fi enabled device is powered up, at 604, the Wi-Fi enabled device uses a unique identifier of the Wi-Fi enabled device as a seed to generate a temporary SSID and temporary passphrase. For example, cloud-based Wi-Fi agent 220 installed on Wi-Fi range extender 208e may use a unique identifier of Wi-Fi range extender 208e as a seed to generate a temporary SSID and temporary passphrase using a predetermined algorithm. The unique identifier may be any identifier that uniquely identifies the Wi-Fi enabled device, including the Universal Product Code (UPC), the manufacturer's serial number (MSN), or the media access control (MAC) address of the Wi-Fi enabled device.

At 606, the Wi-Fi enabled device listens to the temporary SSID. When the Wi-Fi enabled device hears the temporary SSID broadcasted by an AP, the Wi-Fi enabled device uses the temporary passphrase to associate with the AP. For example, cloud-based Wi-Fi agent 220 may configure Wi-Fi range extender 208e to listen to the temporary SSID such that the range extender may use the temporary passphrase to associate with an AP broadcasting that temporary SSID.

At 608, a unique identifier of the Wi-Fi enabled device and a unique identifier of the AP are sent to the cloud-based Wi-Fi service manager. For example, the IT administrator or the end-user may use the Wi-Fi service dashboard to scan in the unique identifiers of Wi-Fi gateway 206 and Wi-Fi range extender 208e, respectively. The scanned unique identifiers are then sent to cloud-based Wi-Fi service manager 216. The unique identifiers may be any identifiers that uniquely identify the Wi-Fi enabled device and the AP, respectively. For example, the unique identifier of the Wi-Fi enabled device may include the Universal Product Code (UPC), the manufacturer's serial number (MSN), or the media access control (MAC) address of the Wi-Fi enabled device. The unique identifier of the AP may include the Universal Product Code (UPC), the manufacturer's serial number (MSN), or the media access control (MAC) address of the AP.

At 610, the cloud-based Wi-Fi service manager receives the unique identifiers of the AP and the Wi-Fi enabled device, and the manager determines that the user has decided to configure the Wi-Fi enabled device to associate with the AP. For example, after cloud-based Wi-Fi service manager 216 receives the unique identifiers sent by the Wi-Fi service dashboard, cloud-based Wi-Fi service manager 216 determines that the user has selected Wi-Fi gateway 206 as the AP providing Wi-Fi services to Wi-Fi range extender 208e.

At 612, the cloud-based Wi-Fi service manager uses the predetermined algorithm and the unique identifier of the Wi-Fi enabled device received at 608 as the seed to generate the temporary SSID and the temporary passphrase. The temporary SSID and the temporary passphrase are then sent to the AP. For example, cloud-based Wi-Fi service manager 216 may use the same algorithm used by Wi-Fi range extender 208e and the unique identifier of Wi-Fi range extender 208 as the seed to generate the temporary SSID and the temporary passphrase. The temporary SSID and the temporary passphrase are then sent to cloud-based AP agent 218 installed on Wi-Fi gateway 206. Cloud-based AP agent 218 then configures Wi-Fi gateway 206 with the temporary SSID and temporary passphrase.

Alternatively, at 612, the cloud-based Wi-Fi service manager sends the unique identifier of the Wi-Fi enabled device to the cloud-based agent installed on AP. The cloud-based agent installed on AP then uses the predetermined algorithm and the unique identifier as the seed to generate the temporary SSID and the temporary passphrase. The agent then configures the AP with the temporary SSID and temporary passphrase.

At 614, the AP starts to broadcast the temporary SSID in addition to the original SSID configured for the AP. The AP is also configured to connect with any Wi-Fi enabled devices that try to associate with the AP using the temporary SSID and temporary passphrase. For example, Wi-Fi gateway 206 starts to broadcast the temporary SSID and is ready to connect with any Wi-Fi enabled devices that try to associate with it using the temporary SSID and temporary passphrase.

At 616, the Wi-Fi enabled device associates with the AP using the temporary SSID and temporary passphrase. The Wi-Fi enabled device connects to the AP and is able to obtain Wi-Fi services via the AP.

At 618, the cloud-based Wi-Fi service manager sends the original SSID and the original passphrase configured for the AP to the Wi-Fi enabled device. The Wi-Fi enabled device can receive the original SSID and the original passphrase from the cloud-based Wi-Fi service manager because the Wi-Fi enabled device has a wireless connection established at 616. For example, cloud-based Wi-Fi service manager 216 sends the original SSID and the original passphrase configured for Wi-Fi gateway 206 to Wi-Fi range extender 208e. Cloud-based Wi-Fi agent 220 then configures Wi-Fi range extender 208e with the original SSID and original passphrase.

At 620, the Wi-Fi enabled device associates with the AP using the AP's original SSID and passphrase. For example, Wi-Fi range extender 208e associates with Wi-Fi gateway 206 using the gateway's original SSID and passphrase.

At 622, the cloud-based Wi-Fi service manager sends a request to the AP, requesting the AP to terminate the broadcasting and usage of the temporary SSID and the temporary passphrase. In some embodiments, the cloud-based Wi-Fi service manager waits until the Wi-Fi enabled device has successfully associated with the AP using the AP's original SSID and passphrase before it sends the request to the AP. In some embodiments, the cloud-based Wi-Fi service manager waits for a predetermined period of time after the original SSID and the original passphrase have been sent to the Wi-Fi enabled device before the manager sends the request to the AP.

At 624, the AP receives the request from the cloud-based service manager, requesting the AP to terminate the broadcasting and usage of the temporary SSID and the temporary passphrase. The AP then stops the broadcasting of the temporary SSID. For example, cloud-based Wi-Fi agent 218 installed on gateway 206 receives the request from cloud-based Wi-Fi service manager 216, and cloud-based Wi-Fi agent 218 configures gateway 206 to stop the broadcasting of the temporary SSID.

Referring back to FIG. 3, at 314, the IT administrator may monitor the AP using the Wi-Fi service dashboard. The Wi-Fi service dashboard may also alert the IT administrator when issues concerning the AP arise. At 316, the IT administrator may monitor a Wi-Fi enabled device using the Wi-Fi service dashboard. The Wi-Fi service dashboard may also alert the IT administrator when issues concerning the Wi-Fi enabled device arise. For example, if an object is blocking the Wi-Fi enabled device, causing the Wi-Fi enabled device to fall outside the coverage area of the AP, then the Wi-Fi service dashboard may send a notification to alert the IT administrator. In another example, the Wi-Fi service dashboard may also display the signal strength quality of the Wi-Fi enabled device. The signal strength quality may be shown in different colors (e.g., green, orange, and red) to indicate different quality levels. An IT administrator or end-user may use the signal strength quality display to determine a suitable position for installing the Wi-Fi enabled device.

In some embodiments, a set of configurations of a Wi-Fi enabled device that has been sent from the cloud-based Wi-Fi service manager once can be used again even if the Wi-Fi enabled device has been rebooted. After a Wi-Fi enabled device has been activated at 312 (of process 300), the configurations (including the AP's original SSID and passphrase) are stored in a memory of the Wi-Fi enabled device. After the Wi-Fi enabled device has been rebooted, the cloud-based Wi-Fi agent may retrieve the stored SSID and passphrase and configure the Wi-Fi enabled device to use the stored SSID and passphrase again. The advantage of this method is that the Wi-Fi enabled device does not need to perform process 600 a second time.

In some embodiments, instead of storing a set of configurations of a Wi-Fi enabled device in a memory of the Wi-Fi enabled device, the unique identifier of the Wi-Fi enabled device that has previously been sent to the cloud-based Wi-Fi service manager at 608 of process 600 is stored in the cloud-based Wi-Fi service manager's database or memory. After a Wi-Fi enabled device has been rebooted, the cloud-based Wi-Fi service manager may repeat some of the steps in process 600 such that the Wi-Fi enabled device may associate first with the AP using the temporary SSID and temporary passphrase and then associate at a later time with the AP using the AP's original SSID and passphrase. For example, after a Wi-Fi enabled device has been rebooted, steps 612 to 624 may be performed. The advantage of this method is that the Wi-Fi enabled device does not need a human user to intervene, for example by scanning in the unique identifiers again.

Figure 7:
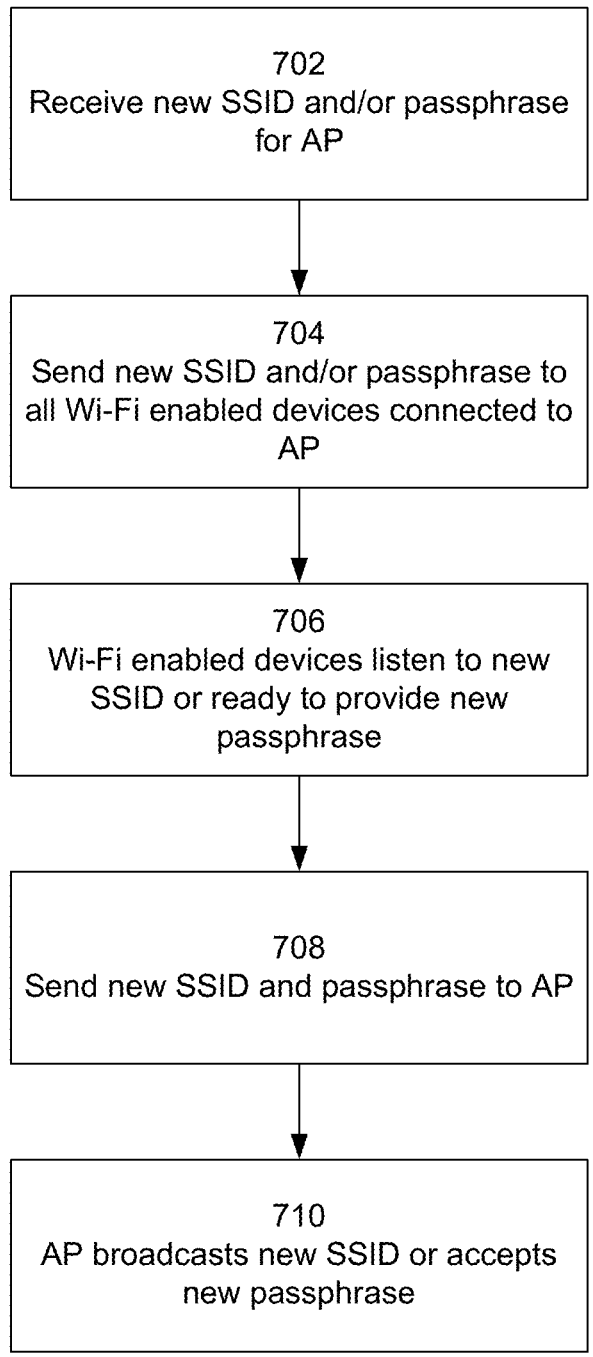
FIG. 7 illustrates an embodiment of a process 700 for seamlessly changing the SSID and/or passphrase of an AP.

In some embodiments, the cloud-based Wi-Fi service manager may be used to control and configure the Wi-Fi enabled devices that are currently connected and associated with an AP to seamlessly transition to a new set of SSID and passphrase configured for the AP. FIG. 7 illustrates an embodiment of a process 700 for seamlessly changing the SSID and/or passphrase of an AP.

At 702, the cloud-based Wi-Fi service manager receives a new SSID and/or a new passphrase for the AP. For example, an IT administrator or an end-user may use the Wi-Fi service dashboard to configure a new SSID and/or a new passphrase for the AP. At 704, the cloud-based Wi-Fi service manager sends the received new SSID and/or passphrase for the AP to each of the Wi-Fi enabled devices that are currently connected to the AP. At 706, the cloud-based Wi-Fi agents installed on each of the Wi-Fi enabled devices configure the Wi-Fi enabled devices with the new SSID and/or passphrase for the AP. The Wi-Fi enabled devices begin to listen to the new SSID or are ready to provide the new passphrase to the AP. At 708, the cloud-based Wi-Fi service manager sends the new SSID and/or new passphrase for the AP to the AP. At 710, the cloud-based Wi-Fi agents installed on the AP configure the AP with the new SSID and/or passphrase for the AP.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of activating and configuring a Wi-Fi enabled device to connect with a Wi-Fi Access Point (AP) by a cloud-based Wi-Fi service manager, comprising:
  receiving a unique identifier of the Wi-Fi enabled device and a unique identifier of the Wi-Fi AP by the cloud-based Wi-Fi service manager which is deployed in a cloud and configured to manage a plurality of Wi-Fi networks remotely through the Internet;
  using the unique identifier of the Wi-Fi enabled device as a seed for a predetermined algorithm to generate a temporary service set identifier (SSID) and a temporary passphrase;
  sending the temporary SSID and the temporary passphrase to the Wi-Fi AP for configuring the Wi-Fi AP with the temporary SSID and the temporary passphrase such that the Wi-Fi AP broadcasts the temporary SSID in addition to an original SSID configured for the Wi-Fi-AP, wherein the temporary SSID is broadcast by the Wi-Fi AP until the Wi-Fi enabled device associates and/or for a predetermined period of time;
  determining that the Wi-Fi enabled device has associated with the Wi-Fi AP using the temporary SSID and the temporary passphrase;

in response to the determination, sending the original SSID and passphrase of the Wi-Fi AP to the Wi-Fi enabled device for configuring the Wi-Fi enabled device with the original SSID and passphrase of the Wi-Fi AP;
receiving a new SSID or a new passphrase for the Wi-Fi AP; and
configuring the new SSID or the new passphrase for the Wi-Fi AP on the Wi-Fi enabled device first and subsequently configuring the new SSID or the new passphrase on the Wi-Fi AP.

2. The method of claim 1, wherein the predetermined algorithm and the seed are used by the Wi-Fi enabled device to generate the temporary SSID and the temporary passphrase, and wherein the Wi-Fi enabled device is configured to listen to the temporary SSID and associate with an AP broadcasting the temporary SSID using the temporary passphrase.

3. The method of claim 1, further comprising:
determining that the Wi-Fi enabled device has associated with the Wi-Fi AP using the original SSID and passphrase of the Wi-Fi AP; and
in response to the determination, requesting the Wi-Fi AP to stop using the temporary SSID and the temporary passphrase.

4. The method of claim 1, wherein the original SSID and passphrase of the Wi-Fi AP are stored by the Wi-Fi enabled device in a memory, and in the event of a reboot of the Wi-Fi enabled device, the Wi-Fi enabled device is configured again with the original SSID and passphrase of the Wi-Fi AP.

5. The method of claim 1, further comprising:
storing the unique identifier of the Wi-Fi enabled device by the cloud-based Wi-Fi service manager in a memory;
in the event of a reboot of the Wi-Fi enabled device:
using the unique identifier of the Wi-Fi enabled device as the seed for the predetermined algorithm to generate the temporary service set identifier (SSID) and the temporary passphrase; and
sending the temporary SSID and the temporary passphrase to the Wi-Fi AP for configuring the Wi-Fi AP with the temporary SSID and the temporary passphrase.

6. The method of claim 1, wherein the unique identifier of the Wi-Fi enabled device is selected from the group consisting of: a Universal Product Code, a manufacturer's serial number, and a media access control (MAC) address of the Wi-Fi enabled device.

7. The method of claim 1, wherein receiving the unique identifier of the Wi-Fi enabled device and the unique identifier of the Wi-Fi AP by the cloud-based Wi-Fi service manager comprises:
receiving the unique identifier of the Wi-Fi enabled device and the unique identifier of the Wi-Fi AP from a user interface accessible by a mobile application.

8. The method of claim 7, wherein the unique identifier of the Wi-Fi enabled device and the unique identifier of the Wi-Fi AP are scanned in by an administrator using the user interface.

9. A method of activating and configuring a Wi-Fi enabled device to connect with a Wi-Fi Access Point (AP) by a cloud-based Wi-Fi service manager, comprising
receiving a unique identifier of the Wi-Fi enabled device and a unique identifier of the Wi-Fi AP by the cloud-based Wi-Fi service manager which is deployed in a cloud and configured to manage a plurality of Wi-Fi networks remotely through the Internet; and
sending the unique identifier of the Wi-Fi enabled device to the Wi-Fi AP, wherein the unique identifier of the Wi-Fi enabled device is used by the AP as a seed for a predetermined algorithm to generate a temporary service set identifier (SSID) and a temporary passphrase, wherein the Wi-Fi AP broadcasts the temporary SSID in addition to an original SSID configured for the Wi-Fi-AP, and wherein the temporary SSID is broadcast by the Wi-Fi AP until the Wi-Fi enabled device associates and/or for a predetermined period of time; and
wherein the Wi-Fi AP is configured with the temporary SSID and the temporary passphrase;
determining that the Wi-Fi enabled device has associated with the Wi-Fi AP using the temporary SSID and the temporary passphrase;
in response to the determination, sending the original SSID and passphrase of the Wi-Fi AP to the Wi-Fi enabled device for configuring the Wi-Fi enabled device with the original SSID and passphrase of the Wi-Fi AP;
receiving a new SSID or a new passphrase for the Wi-Fi AP; and
configuring the new SSID or the new passphrase for the Wi-Fi AP on the Wi-Fi enabled device first before configuring the new SSID or the new passphrase on the Wi-Fi AP.

10. The method of claim 9, wherein the predetermined algorithm and the seed are used by the Wi-Fi enabled device to generate the temporary SSID and the temporary passphrase, and wherein the Wi-Fi enabled device is configured to listen to the temporary SSID and associate with an AP broadcasting the temporary SSID using the temporary passphrase.

11. The method of claim 9, further comprising:
determining that the Wi-Fi enabled device has associated with the Wi-Fi AP using the original SSID and passphrase of the Wi-Fi AP; and
in response to the determination, requesting the Wi-Fi AP to stop using the temporary SSID and the temporary passphrase.

12. A system for activating and configuring a Wi-Fi enabled device to connect with a Wi-Fi Access point (AP), comprising:
a processor configured to:
receive a unique identifier of the Wi-Fi enabled device and a unique identifier of the Wi-Fi AP;
use the unique identifier of the Wi-Fi enabled device as a seed for a predetermined algorithm to generate a temporary service set identifier (SSID) and a temporary passphrase;
send the temporary SSID and the temporary passphrase to the Wi-Fi AP for configuring the Wi-Fi AP with the temporary SSID and the temporary passphrase such that the Wi-Fi AP broadcasts the temporary SSID in addition to an original SSID configured for the Wi-Fi-AP, wherein the temporary SSID is broadcast by the Wi-Fi AP until the Wi-Fi enabled device associates and/or for a predetermined period of time;
determine that the Wi-Fi enabled device has associated with the Wi-Fi AP using the temporary SSID and the temporary passphrase;
in response to the determination, send the original SSID and passphrase of the Wi-Fi AP to the Wi-Fi enabled device for configuring the Wi-Fi enabled device with the original SSID and passphrase of the Wi-Fi AP;

receive a new SSID or a new passphrase for the Wi-Fi AP; and configure the new SSID or the new passphrase for the Wi-Fi AP on the Wi-Fi enabled device first before configuring the new SSID or the new passphrase on the Wi-Fi AP; and a memory coupled to the processor and configured to provide the processor with instructions, wherein the system comprises a cloud-based Wi-Fi service manager which is deployed in a cloud and configured to manage a plurality of Wi-Fi networks remotely through the Internet.

13. The system of claim 12, wherein the predetermined algorithm and the seed are used by the Wi-Fi enabled device to generate the temporary SSID and the temporary passphrase, and wherein the Wi-Fi enabled device is configured to listen to the temporary SSID and associate with an AP broadcasting the temporary SSID using the temporary passphrase.

14. The system of claim 12, wherein the processor is further configured to:
determine that the Wi-Fi enabled device has associated with the Wi-Fi AP using the original SSID and passphrase of the Wi-Fi AP; and
in response to the determination, request the Wi-Fi AP to stop using the temporary SSID and the temporary passphrase.

15. The system of claim 12, wherein the original SSID and passphrase of the Wi-Fi AP are stored by the Wi-Fi enabled device in a memory, and in the event of a reboot of the Wi-Fi enabled device, the Wi-Fi enabled device is configured again with the original SSID and passphrase of the Wi-Fi AP.

16. The system of claim 12, wherein the processor is further configured to:
store the unique identifier of the Wi-Fi enabled device in a memory;
in the event of a reboot of the Wi-Fi enabled device:
use the unique identifier of the Wi-Fi enabled device as the seed for the predetermined algorithm to generate the temporary service set identifier (SSID) and the temporary passphrase; and
send the temporary SSID and the temporary passphrase to the Wi-Fi AP for configuring the Wi-Fi AP with the temporary SSID and the temporary passphrase.

17. The system of claim 12, wherein the unique identifier of the Wi-Fi enabled device is selected from the group consisting of: a Universal Product Code, a manufacturer's serial number, and a media access control (MAC) address of the Wi-Fi enabled device.

18. The system of claim 12, wherein receiving the unique identifier of the Wi-Fi enabled device and the unique identifier of the Wi-Fi AP comprises:
receiving the unique identifier of the Wi-Fi enabled device and the unique identifier of the Wi-Fi AP from a user interface accessible by a mobile application.

19. The system of claim 18, wherein the unique identifier of the Wi-Fi enabled device and the unique identifier of the Wi-Fi AP are scanned in by an administrator using the user interface.

20. A system for activating and configuring a Wi-Fi enabled device to connect with a Wi-Fi Access Point (AP), comprising:
a wireless device; and
a processor configured to:

receive a unique identifier of the Wi-Fi enabled device and a unique identifier of the Wi-Fi AP via the wireless device; and
send the unique identifier of the Wi-Fi enabled device to the Wi-Fi AP via the wireless device, wherein the unique identifier of the Wi-Fi enabled device is used by the AP as a seed for a predetermined algorithm to generate a temporary service set identifier (SSID) and a temporary passphrase, wherein the Wi-Fi AP broadcasts the temporary SSID in addition to an original SSID configured for the Wi-Fi-AP, and wherein the temporary SSID is broadcast by the Wi-Fi AP until the Wi-Fi enabled device associates and/or for a predetermined period of time;
determine that the Wi-Fi enabled device has associated with the Wi-Fi AP using the temporary SSID and the temporary passphrase;
in response to the determination, send the original SSID and passphrase of the Wi-Fi AP to the Wi-Fi enabled device for configuring the Wi-Fi enabled device with the original SSID and passphrase of the Wi-Fi AP;
receive a new SSID or a new passphrase for the Wi-Fi AP; and
configure the new SSID or the new passphrase on the Wi-Fi AP to the Wi-Fi enabled device first before configuring the new SSID or the new passphrase on the Wi-Fi AP,
wherein the system comprises a cloud-based Wi-Fi service manager which is deployed in a cloud and configured to manage a plurality of Wi-Fi networks remotely through the Internet.

21. The system of claim 20, wherein the predetermined algorithm and the seed are used by the Wi-Fi enabled device to generate the temporary SSID and the temporary passphrase, and wherein the Wi-Fi enabled device is configured to listen to the temporary SSID and associate with an AP broadcasting the temporary SSID using the temporary passphrase.

22. The system of claim 20, wherein the processor is further configured to:
determine that the Wi-Fi enabled device has associated with the Wi-Fi AP using the original SSID and passphrase of the Wi-Fi AP; and
in response to the determination, request the Wi-Fi AP to stop using the temporary SSID and the temporary passphrase.

23. A computer program product for activating and configuring a Wi-Fi enabled device to connect with a Wi-Fi Access Point (AP) by a cloud-based Wi-Fi service manager, the computer program product being embodied in a non-transitory computer readable storage medium and comprising computer instructions for:
receiving a unique identifier of the Wi-Fi enabled device and a unique identifier of the Wi-Fi AP;
using the unique identifier of the Wi-Fi enabled device as a seed for a predetermined algorithm to generate a temporary service set identifier (SSID) and a temporary passphrase;
sending the temporary SSID and the temporary passphrase to the Wi-Fi AP for configuring the Wi-Fi AP with the temporary SSID and the temporary passphrase such that the Wi-Fi AP broadcasts the temporary SSID in addition to an original SSID configured for the Wi-Fi-AP, wherein the temporary SSID is broadcast by the Wi-Fi AP until the Wi-Fi enabled device associates and/or for a predetermined period of time;

determining that the Wi-Fi enabled device has associated with the Wi-Fi AP using the temporary SSID and the temporary passphrase;

in response to the determination, sending the original SSID and passphrase of the Wi-Fi AP to the Wi-Fi enabled device for configuring the Wi-Fi enabled device with the original SSID and passphrase of the Wi-Fi AP;

receiving a new SSID or a new passphrase for the Wi-Fi AP; and configuring the new SSID or the new passphrase for the Wi-Fi AP on the Wi-Fi enabled device first before configuring the new SSID or the new passphrase on the Wi-Fi AP, wherein the cloud-based Wi-Fi service manager is deployed in a cloud and configured to manage a plurality of Wi-Fi networks remotely through the Internet.

* * * * *